United States Patent [19]
Colussi et al.

[11] Patent Number: 5,240,039
[45] Date of Patent: Aug. 31, 1993

[54] ROTOR FOR ADAPTING STATIC ELEMENTS TO ELEMENTS ROTATING AROUND A SHAFT

[75] Inventors: Rafael A. Colussi; Néstor J. Vénica, both of Guadalupe Norte, Argentina

[73] Assignee: Col-Ven S.A., Guadalupe Norte, Argentina

[21] Appl. No.: 810,503

[22] Filed: Dec. 19, 1991

[51] Int. Cl.$^5$ .............................................. B60C 23/00
[52] U.S. Cl. ..................................... 137/580; 152/417
[58] Field of Search ............... 137/580, 581, 257, 258; 152/417

[56] References Cited

U.S. PATENT DOCUMENTS

| | | | |
|---|---|---|---|
| 1,016,896 | 2/1912 | Rivers | 152/417 |
| 1,040,643 | 10/1912 | Darnley | 152/417 |
| 2,090,089 | 8/1937 | Wiegand | 152/417 |
| 2,913,002 | 11/1959 | Janas | 137/580 |
| 3,276,503 | 10/1966 | Kilmarx | 152/417 |
| 3,381,704 | 5/1968 | Richardson | 137/580 X |
| 4,749,335 | 6/1988 | Brandt et al. | 137/580 X |

Primary Examiner—John Rivell
Attorney, Agent, or Firm—Notaro & Michalos

[57] ABSTRACT

Mounting block for a shaft opened at an end and having in its interior a series of decreasing diameter chambers, defining in the first chamber a bearing with a plurality of balls retained between two races. An outer race forming the block cover and in turn housing an upper retainer and an inner race attached to the shaft providing the other mating surface for the bearing. Following the inner race, a washer is mounted fitting on its periphery against a cylindrical projection of the first race. Next, a second inner retainer is mounted in the second chamber. The axially drilled shaft has, mating with the third chamber, a cross hollow pin communicating with the chamber, which in turn communicates with the outside by means of two radial passages made in the body, these passages ending in outer nozzles. The axial conduit of the shaft exits, at an angle of 90°, through the end exiting from the block opening.

10 Claims, 3 Drawing Sheets

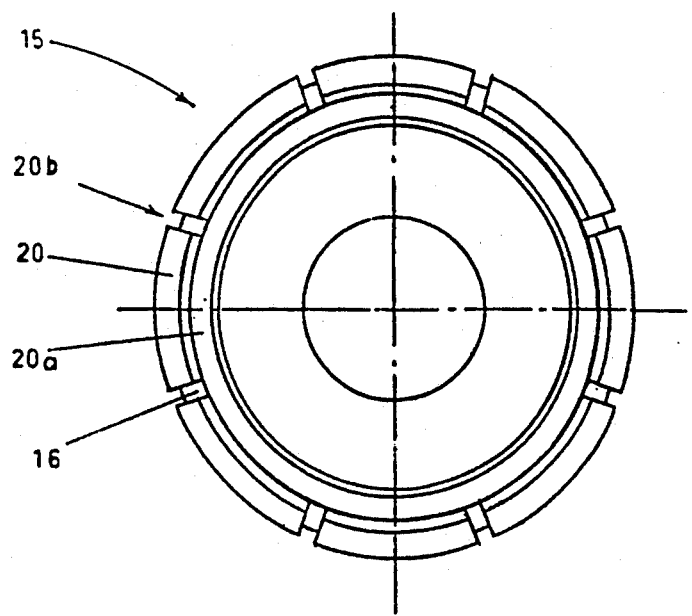
FIG.3
FIG.4
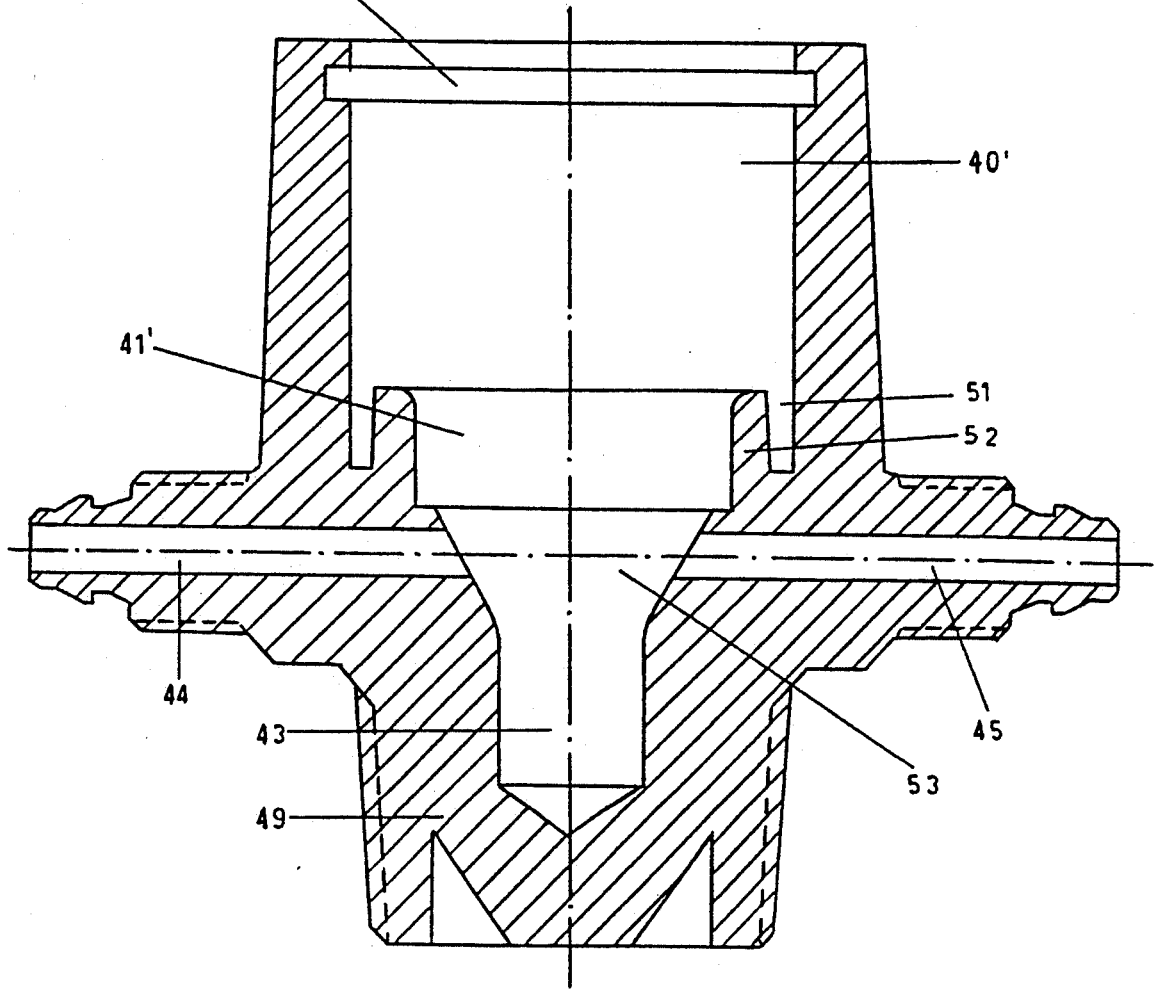

ROTOR FOR ADAPTING STATIC ELEMENTS TO ELEMENTS ROTATING AROUND A SHAFT

FIELD OF THE INVENTION

The instant invention relates to a rotor for adapting static elements rotating around a shaft, and its main object is the application of the rotor as an intermediate element between two or more elements rotating around a shaft, such as vehicle wheels, or other types of arrangements among which hydraulic equipment at a relatively high pressure and temperatures, e.g. steam equipment, printing machinery, cooling lines, polishing machines, cold and hot cylinder paper machines, textile machines, calenders into which static devices may be included, such as pneumatic pressure sensors for such wheels, may be mentioned. The rotor of the invention is most useful in equipment developed for maintaining, by means of sensors, the watching of not only tire pressure, but also the strict control of certain functional parameters of an internal combustion engine, including, among others, the temperature of the cooling fluid or of the lubricating oil, apart from their pressure.

A further object of the invention is a rotatory joint consisting of a rotor adapting between static and rotatory elements, which due to its simple and economical construction, as well as due to its safe operation, may be disposed of upon termination of its extreme life. Due to the structural features of the component elements, almost all the parts may be made by molding suitable plastic materials.

PRIOR ART

Argentine patent No. 217,973 referring to a "Stabilizing device for compensating automotive tire pressure", discloses a cylindrical hollow body constituted by two parts connected by threads, in which a bearing is included for receiving rotationally a coaxial tubular body formed in turn by two threaded portions. One end portion broadens into a cavity inside which there is a free piston. The outlet of the cavity is by-passed by means of a tube, towards the valve of the tire under control. At the other end, the tubular body ends in a pipe connecting the device to a compressed air reservoir, in which air is compressed at a pressure higher than that required by the tire.

Argentine Patent No. 221,561 discloses "An electrical device for controlling vehicle tire pressure". The device is comprise by a first pressure sensor assembly and a second collector brush assembly, the first assembly being connected to the wheel by means of a device comprised by a hollow body with a sleeve having a poly-faced outer shape, constituting longitudinal passages in a portion of the sleeve, communicated with a fluid inlet chamber whose inside limits are stablished by a step formed in a fixed body, exiting through an end thereof. This sleeve is provided with a radial opening at the other end, through which said passages communicate with the interior of the sleeve. Inside the hollow body there is a plunger displacing lengthwise surrounded by an O-ring having an outer diameter smaller than the inner diameter of the fixed body, but larger that the diameter of the end of the mentioned sleeve, this ring being located between two annular edges provided at the plunger. On one of said edges, a first decompression spring bears between the plunger and a circular flange of the sleeve. This first spring biases the plunger towards a first position in which the seal closes the communication between the fluid inlet chamber and the longitudinal communicating passages. In the second position, the plunger opens said communication by means of the pressure contained in the chamber, which is higher than the tension of said first spring. Within the sleeve there is, mounted coaxially, a hollow cylinder carrying another O-ring also positioned between the circular projections of the hollow cylinder. Against one of these projections or flanges, a second compression spring is located, wound over the end of the cylindrical body, being laid with respect to the circular flange of the sleeve. Between the cylinder and the sleeve there is a fluid chamber into which radial openings of the sleeve are opened. The hollow cylinder has at an end a broadened chamber filled with a filtering material through which fluid may pass. Due to the value of the internal pressure and to the force of the second spring, the end of the hollow cylinder may be positioned at a first position within the fixed body into which these components are contained, or otherwise exit when in a second position passing through a hole, the seals and a skirt located at the end of the fixed body. At that place and functionally, it will make mechanical and electrical contact with the second collector brush assembly made of electrically conductive material, such as the material used for the first assembly in order to communicate electric continuity to the failure indicator device.

Argentine patent No. 231,948 discloses "A device for mounting wheels, having an apparatus for the automatic inflatation of tires", comprising a rim mounting arrangement with its hub on the shaft head, comprising to this purpose a static elongated spindle (non-rotatory), a hub with a large inner cavity being rotatingly mounted around the spindle on two separated tapered bearings. The spindle is connected to the hub by means of a shaft. The hub cavity is limited by two O-rings having a channeled cross section, being connected to seat arrangements in the rotary portion of the wheel assembly, at both sides of said cavity between both bearings, holding the bodies of the O-rings laterally in place, such that the flexible edges of the rings be positioned above the spindles. The device has a tight air passage running from an inlet located at inner portions of the spindle and an outlet at the outer portions of the hub including an opening in the spindle between the flange portions of the O-rings and said cavity.

The practice of the above embodiments is cumbersome and includes an extensive machining work to obtain the elements constituting them, which also due to their complex nature are prone to producing failures, fluid losses and lockings thus imparing safety during operation.

Argentine patent No. 231,948 relates to an alternative in the mounting of the rim and to a particular arrangement between the rim and its support requiring modification of the vehicle structure.

SUMMARY OF THE INVENTION

In order to overcome the disadvantages of the prior art embodiments, the instant invention deletes elements causing forces which produce fluid losses, very difficult to detect and amend, and which increase greatly the cost of the device. In accordance with the invention, the rotor for adapting static elements includes a block housing, a shaft which has an open end, its inner cavity being stepped as per a succession of decreasing diameter chambers, in which the first chamber has a bearing mounted therein, said bearing being formed by balls arranged as a crown retained between two races from which, the outer race, fixed to the block, apart from providing the bearing surface, forms an enclosure for a seal, while the inner race, fixed to the shaft, provides the other bearing surface. The outer race fits on the first chamber by means of a cylindrical skirt which, in its outer portion, is embedded into a peripheral channel formed at the mouth of the block, which is also cylindrical, and provided with a washer from an inner retainer housed in the second chamber, which next to the inner retainer introduces, into the third chamber, a pair of traverse conduits extending outwardly towards the block into corresponding connecting nozzles, a through-hole communicating with the chamber, this being drilled for mating with said shaft which in turn communicates with an axial conduit projecting from outside through a 90° bent at the end portion opposite to that fitting on the last chamber of the block, defining a bearing for said shaft.

BRIEF DESCRIPTION OF THE DRAWINGS

The invention will be further understood with reference to the following detailed description taken along with the accompanying drawings, in which:

FIG. 3 is a top plan view of the race-cover included in the rotor and;

FIG. 4 is an elevational cross-section of an alternative embodiment of the block included in the rotor of the invention.

In the figures, the same reference numerals designate the same or equivalent parts.

DETAILED DESCRIPTION OF THE INVENTION

Figure 1:
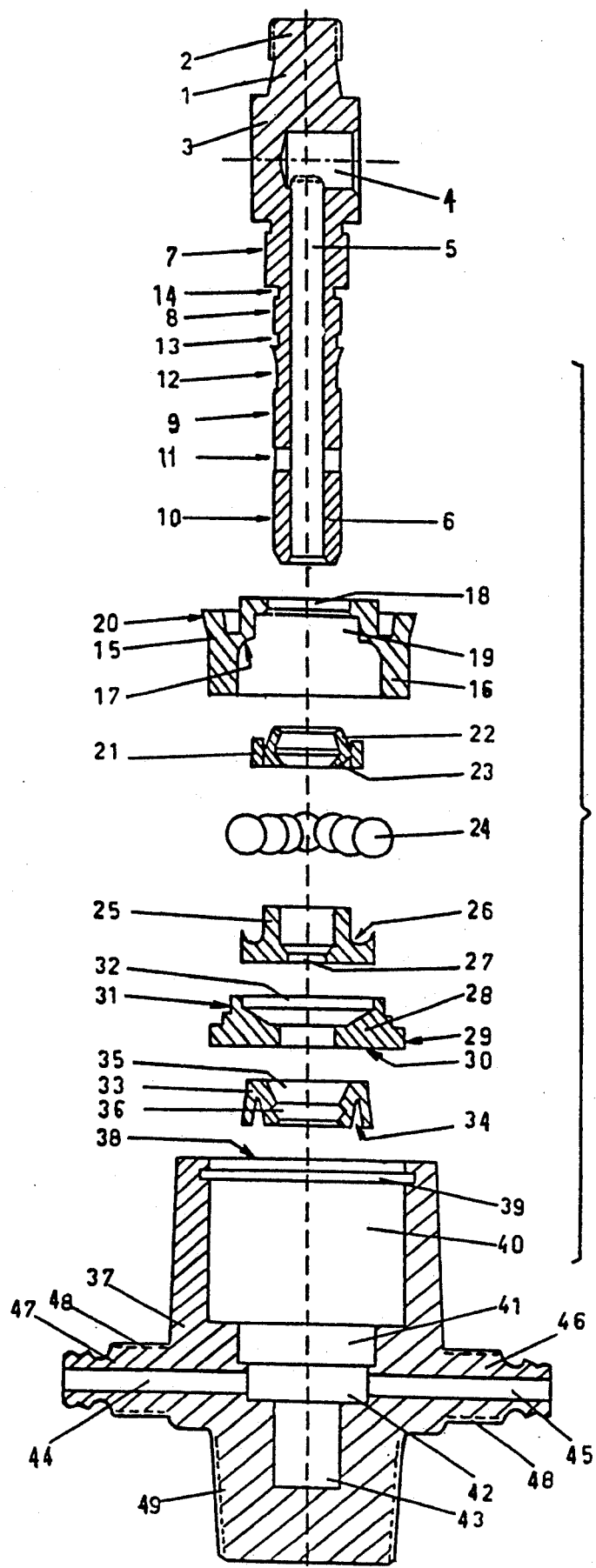
FIG. 1 is an exploded view of the device of the invention.

FIG. 1 shows the shaft 1 having a threaded end 2 and a larger diameter portion 3 into which a blind hole 4 with an inside thread is drilled, this being first means for communicating with the outside by means of an axial conduit 5 reaching the other end 6. On the contour of the shaft there are polished annular rings or surfaces 7, 8, 9 and 10. Between surfaces 9 and 10 there is a diametral or cross hole 11 passing through axial conduit 5. Also between rings 7, 8 and 9 there are annular channels 12, 13 and 14.

FIG. 1 also shows the outer race 15, having a cylindrical body 16 at the mean inner part of which a concave bearing surface 17 exists. At the top, as shown in the drawing, there is a decrease in the diameter 18 for adapting to the shaft, which forms an inner housing 19. On the upper outer surface there is an annular skirt, of substantially trapezoidal cross section 20, projecting with a slight slope outwardly from the cylindrical body, defined by an annular channel 20a. This skirt 20 has a plurality of radial cuts for the sake of flexibility. See FIGS. 2 and 3.

At the inner housing 19 (see FIG. 2) the retainer or seal 21 is mounted, adopting a K-shaped section, having a cylindrical outer portion and the two branches 22 and 23 directed towards the central shaft.

A plurality of balls 24 are contained between the outer race 15 and the inner race 25, the latter forming the bearing surface 26 mating with the former surface 17. The inner diameter has been reduced forming a recess 27 to adapt it to that of the shaft fitted into channel 13.

Washer 28 may be also seen, having a cylindrical surface 29 and a planar base 30, also having a shoulder 31 around its contour determining an annular skirt 32 of smaller diameter.

The inner seal 33 is also shown, having a relatively deep groove 34 open at its lower face affecting almost the whole seal body. At the inner seal surface there are two annular shoulders of the saw teeth type formed by tapered surfaces 35 and 36 directed towards the base of the part.

The housing block 37 is also shown. It has a substantially cylindrical body, opened at an end 38, having close to its mouth an annular channel 39. The inner cavity is stepped as per decreasing diameters, thus defining a plurality of successive chambers. The first chamber 40 is the larger one, followed by the second chamber 41, the third chamber 42 and the fourth chamber 43.

The cross diametrally opposed holes 44 and 45 enter into the third chamber 42 and exit through corresponding connecting nozzles 46 and 47. The body of the nozzles may have a threaded outer surface as well as the lower end 49 of the block body 37.

Figure 2:
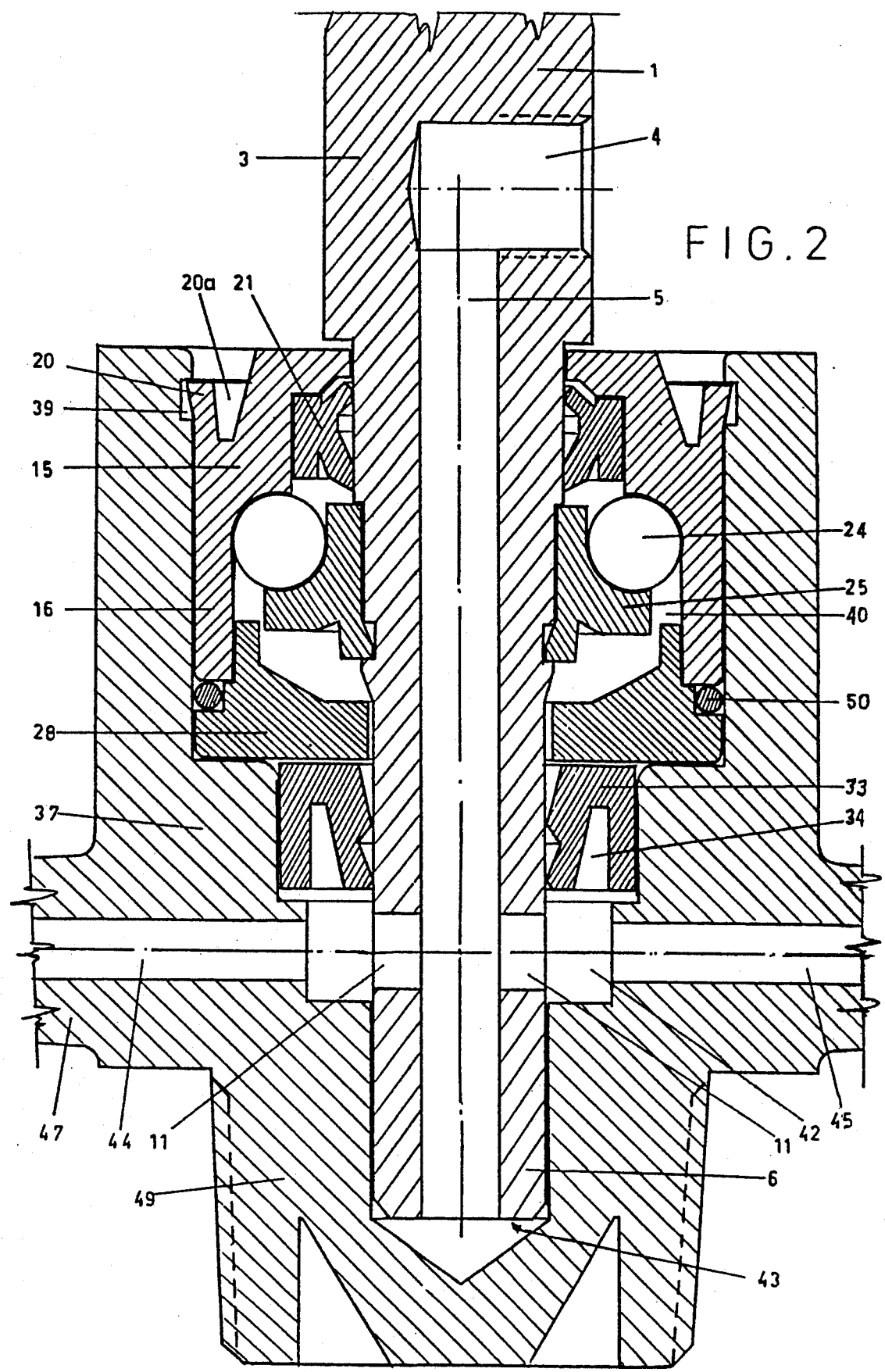
FIG. 2 is a partial elevational view of the rotor in accordance with the invention.

FIG. 2 is a cross section of the assembly in which the way in which shaft 1 is mounted inside the housing block 37 may be seen. The last chamber operates as a first bearing 43 receiving the end 6 of polished surface 10 to this purpose, races 15, 25 and balls 24 being a second bearing. Its cross hole 11 is positioned within the third chamber 42 coaxially to cross holes 44 and 45. At the chamber 41 there is an inner seal 33 with toothed surfaces 35 and 36 working on the polished ring 9 of the shaft 1. Washer 28 fits at the bottom of the first chamber 40 mating with a lower diameter of the shaft to leave a small play and the outer surface 29 is connected to the wall of the first chamber. The shoulder 31 determining the annular skirt 32 serves as a support for the end contour of the cylindrical body 16 of the first race 15 which, along with the inner race 25, forms a bearing with balls 24. To this purpose, the races have bearing surfaces 17 and 26 the concavity of which covers a generatrix of a quarter circumference.

The inner race 26 fits its decreased diameter 27 in the annular channel 13 being fixed in position against the polished surface 8 of the shaft 1, while the outer race 15 fits in the cavity 40 forming said first chamber. This outer race 15 forms a cover for the block 37 since its peripheral skirt 20 is introduced within the annular groove 39 due to the elasticity provided by its shape.

In the space 19 inside the outer race 15 the outer seal 21 is positioned, which will be fixed by means of its cylindrical contour supporting its two branches 22 and 23 against the polished ring 7 of the shaft 1.

The space left between the end of the cylindrical body 16 of the outer race 15 and the first shoulder 31 of the ring 28, is foreseen for placing a seal ring 50.

In FIG. No. 3, the radial cuts 20b are seen extending towards portions of the bottom of the channel 20a, giving flexibility to the annular skirt 20 for locking within the annular channel 39.

In the embodiment of FIG. 4, the block includes the same basic features as block 37, the inner structure of the first chamber 40' being modified, extending by means of an annular channel 51 at its bottom, whereby the following chamber 41' begins with a thin cylindrical wall 52 having an inner rounded edge facilitating the proper mounting of the inner seal 33. The third chamber 53 has a frusto-conical shape in this embodiment.

OPERATION

The disposable rotor of the invention is connected to a wheel hub or to the rotating shaft of an equipment, by means of its threaded end 49. Tubes from the tire nozzles under control are connected at 44 and 45, while the cross blind hole 4 of the shaft 1 projects by means of other tube (not shown) towards the pressure control device, in this case. The rotor structure per se allows constant communication between the central device and wheel tires, channelizing the fluid passing through holes 44 and 45 entering the third chamber 43 which is thus enclosed as an annular chamber, allowing passage of fluid through cross hole 11 of the rotating shaft, without interruption, following then through axial hollow pin 5 and the blind hole 4 towards the central control device. According to the circuit conditions, fluid circulation will be effected towards the tire to compensate air losses, the air being provided from the compressed air reservoir of the vehicle.

At the threaded free end of the shaft 1, the joint of the tube going to the central control device may be positioned.

The frusto-conical shape of chamber 53 (see FIG. 3) of the alternative embodiment improves the fluid flow through holes 44, 45 and 5.

It is to be noted that, as an additional result, the air pressure acting in the rotor prevents excessive wearing of the ball bearing.

The invention has been described in connection with an exemplary embodiment thereof, but modifications and/or alternatives apparent to those skilled in the art are intended to be protected by the scope of the invention, which is only limited by the spirit of the appended claims.

We claim:

1. Rotor for rotary coupling and fluid communicating a static element to another element rotating about a shaft, the shaft having a generally cylindrical body with one end and an opposite end portion adapted to form a rotary joint, said one end having first means for communicating fluids, said shaft having an axial conduit for communicating with said first means and said opposite end portion including a diametral hole having an inner end communicating with said axial conduit and an outer end for communicating fluid, said rotor comprising:

a block having an inner stepped cavity open at one end of said block for mounting said shaft, said cavity including;

a first chamber leading out of said open end of the block and provided with an annular channel;

a second chamber inwardly adjacent said first chamber and of a smaller diameter than said first chamber;

a third chamber inwardly adjacent said second chamber and of a smaller diameter than said second chamber;

a fourth chamber inwardly adjacent said third chamber and of a smaller diameter than said third chamber, said fourth chamber being formed with first bearing means for mounting said shaft;

second bearing means between said block and said shaft and in said cavity, said second bearing means including an inner race mounted to said shaft and an outer race fitting into said first chamber, said outer race including a cylindrical body surrounding said inner race and opening outwardly to form a skirt fitted into said annular channel of said first chamber;

first seal means housed inside said outer race for sealing against said shaft;

second seal means housed in said second chamber for sealing against said shaft;

washer means retained between said second seal means and said cylindrical body of said outer race; and conduit means in said block for communicating fluid between the third chamber and said outer end of said diametral hole.

2. Rotor as claimed in claim 1, wherein said first chamber extends inwardly in said block into a further annular channel, said block further comprising a thin cylindrical wall separating said further annular channel from said second chamber.

3. Rotor as claimed in claim 1, wherein said first seal means has a substantially K-shaped cross-section defining a cylindrical outer portion contacting said outer race and a pair of diverging branches directed inwardly toward said shaft.

4. Rotor as claimed in claim 1, wherein said second seal means is substantially cylindrical and includes:

a channel opening inwardly of said block, and an inner, generally saw-tooth shaped surface.

5. Rotor as claimed in claim 1, wherein said outer race has an axial hole comprised by:

a bearing surface of a diameter matching an outer diameter of said shaft it surrounds, a cylindrical housing adjacent said hole outer portion and containing said first seal means, a concave bearing surface having a shape of about a quarter circumference of a circle, and said cylindrical body surrounding said inner race.

6. A rotary joint for coupling and fluid communicating a static element to a rotary element, said joint comprising a shaft coupled to said static element and a rotor coupled to the rotary element; said shaft comprising:

a generally cylindrical body having one end portion adapted to be mounted to said rotor, an axial conduit in fluid communication with said static element, and a diametral hole open at said end portion for communicating fluid between said axial conduit and said rotor; and said rotor comprising a block, said block having an inner stepped cavity open at one end of said block for mounting said shaft, said cavity including:

a first chamber leading out of said open end of the block and provided with an annular channel, a second chamber inwardly adjacent and of a smaller diameter than said first chamber, a third chamber inwardly adjacent and of a smaller diameter than said second chamber, and a fourth chamber inwardly adjacent and of a smaller diameter than said third chamber, said fourth chamber being formed with first bearing means for mounting said shaft;

said rotor including:

second bearing means including an inner race for mounting to said shaft and an outer race fitting into said first chamber, said outer race including a cylindrical body surrounding said inner race and opening outwardly into a skirt fitted into said annular channel, first seal means housed inside said outer race for sealing against said shaft, second seal means housed in said second chamber for sealing against said shaft, washer means retained between said second seal means and said cylindrical body, and conduit means for communicating fluid between the third chamber and said rotating element.

7. Joint as claimed in claim 6, wherein said inner race has a major cylindrical portion clamping on the shaft and a narrow portion of smaller inner diameter than the main portion; said shaft including an annular recess in which said narrow portion fits in.

8. Joint as claimed in claim 6, wherein said shaft includes four polished cylindrical surfaces respectfully mating with both said seals, said inner race and said first bearing means.

9. Joint as claimed in claim 6, wherein said shaft includes a second end portion longitudinally opposed to said end portion mounted to said rotor, said second end portion having a second diametral hole for establishing fluid circulation between said axial conduit and said static element.

10. Joint as claimed in claim 6, wherein said cylindrical body includes a second end portion mounted to said rotor and said block has a closed end portion opposite said one end where the cavity opens out, said second end portion and said closed portion being each threaded for mechanical coupling to said elements.

* * * * *